UNITED STATES PATENT OFFICE.

JAMES SINCLAIR ROSS, OF WESTMINSTER, LONDON, ENGLAND.

PROCESS OF PRODUCING COPPER-SULFATE SOLUTIONS FROM ORES.

1,350,239.

Specification of Letters Patent. Patented Aug. 17, 1920.

No Drawing.   Application filed July 14, 1920. Serial No. 396,062.

*To all whom it may concern:*

Be it known that I, JAMES SINCLAIR ROSS, a subject of the King of Great Britain, residing at 1 Morpeth Terrace, in the city of Westminster and county of London, England, have invented new and useful Improvements in Processes of Producing Copper-Sulfate Solutions from Ores, of which the following is a specification.

The object of my invention is to provide an economical and simple process by which sulfate of copper can be obtained directly from raw, or unroasted, carbonate ores containing copper, I also being able to obtain, if required, such other metals as may be present in the ore; such, for example, as gold, silver, lead, cobalt, nickel, zinc, iron and arsenic.

According to my invention I first treat the copper carbonate ore, in a raw, or unroasted condition, with a dilute solution of, or principally of, sulfuric acid and of a strength which may be in accordance with the copper content of the copper carbonate ore treated. With ordinary copper carbonate ores I may for example employ a five per cent. sulfuric acid solution. When the acid solution in contact with the ore has become sufficiently rich in copper I bring it into contact with a further quantity of unroasted copper carbonate ore which has not been treated with acid and I allow the said solution to remain in contact with the said ore until it has become basic. When the solution is drawn off it will be found to have become richer in copper and to be free from arsenic and from the greater part of the iron. I then bring the said solution to boiling temperature and I keep it at that temperature until sufficient water has been evaporated therefrom, say until the solution has been brought to a density of, or about, 52°, Twaddell (1.26 sp. gr.) During the boiling operation a suitable quantity of some basic, or neutralizing, substance should be added to the boiling solution so that it is kept basic, or neutral, copper oxid for example being suitable for this purpose. In order to assist the deposition of extraneous matter from the solution when it cools after boiling, air, preferably with either, dry or superheated steam, may be forced through the boiling solution preferably in minute jets. After the boiling operation the solution is allowed to stand and become cool, the bulk of remaining extraneous matters present in the sulfate of copper solution then precipitating, or depositing, after which the said solution can be drawn off for utilization in any desired way. For example, if the object be to obtain metallic copper, the sulfate of copper solution can be subjected to any known, or suitable, electrolytic process so that the copper is obtained by electro-deposition,—or the solution can be passed into crystallization vats wherein the sulfate of copper can be obtained in the form of crystals in the usual, or any suitable, way.

The copper carbonate ore which has been used to render basic the solution rich in copper which has been derived from the initial treatment as aforesaid, can be employed as ore to be treated in accordance with my invention.

If in the process according to my invention, after the boiling and cooling operation, it should be found that the sulfate of copper solution still contains some extraneous matters which it is desirable to remove, it can be again boiled and then be allowed to cool to effect the precipitation, or deposition, of such extraneous matters, or be filtered to separate such matters before the copper sulfate solution is drawn off for subsequent electrolysis, crystallization, or other treatment to which it may be intended to subject it.

The matter from which the solution has been separated as aforesaid, can be collected and treated upon filters, or in filter presses, and be subjected to any usual, or suitable, process, or operation, for the separation, or recovery of the various constituents.

If desired the copper carbonate ore, after being subjected to the aforesaid treatment by the sulfuric acid solution and subsequent boiling, can be subjected to the action of solvents which will dissolve any remaining metal, or metals, which it may be desired to obtain separately.

While the copper carbonate ore is being subjected to the action of the sulfuric acid solution, air, with or without dry or super-solution, may be forced into, or through heated steam, for the purpose of oxidation, the mass for the purpose of oxidation.

By the treatment of raw or unroasted copper carbonate ores in accordance with my invention, as hereinbefore described, I can obtain, in an economical and ready manner, a pure, or practically pure, sulfate of copper solution from which, it will be evident, I can obtain crystallized copper sulfate or metallic copper, either of which is also pure, or practically pure.

What I claim is:—

The process of producing copper sulfate solution directly from ores by treating unroasted copper carbonate ore with a dilute solution containing sulfuric acid at substantially below the boiling point, then bringing the resulting copper sulfate solution into contact with a further quantity of unroasted copper carbonate ore which has not been previously treated with acid, such second treatment being effected while the solution is maintained at substantially below its boiling point, and the treatment being continued until the solution becomes basic, subsequently heating the solution and maintaining it at near the boiling temperature, while subjecting the same to the direct action of air and steam, while in contact with solid basic copper compounds, and while maintaining the solution in a non-acid condition until the major part of the extraneous substances are precipitated, and separating such precipitated extraneous substances from the boiled solution, substantially as described.

In testimony whereof I have signed my name to this specification in the presence of two subscribing witnesses.

JAMES SINCLAIR ROSS.

Witnesses:
G. F. TYSON,
EDWD. GEO. DAVIES.